United States Patent [19]

Lean

[11] 3,903,364

[45] Sept. 2, 1975

[54] HIGH RESOLUTION LINE SCANNER

[75] Inventor: Eric Gung-Hwa Lean, Mahopac, N.Y.

[73] Assignee: IBM Corporation, Armonk, N.Y.

[22] Filed: Aug. 23, 1974

[21] Appl. No.: 499,936

[52] U.S. Cl. .................. 178/7.1; 178/7.6; 310/9.8; 333/72

[51] Int. Cl.²... H04N 3/16; H04N 3/00; H01V 7/00

[58] Field of Search............ 178/7.1, 7.6; 250/211 J, 250/212; 333/30 R, 72; 338/32 R; 310/9.8

[56] References Cited

UNITED STATES PATENTS

| | | | |
|---|---|---|---|
| 3,760,299 | 9/1973 | Vasile | 310/9.8 |
| 3,826,865 | 7/1974 | Quate et al. | 178/7.1 |
| 3,826,866 | 7/1974 | Quate et al. | 178/7.1 |
| 3,836,712 | 9/1974 | Kornreich et al. | 178/7.1 |
| 3,852,103 | 12/1974 | Collins et al. | 338/32 |

*Primary Examiner*—Robert L. Griffin
*Assistant Examiner*—R. John Godfrey
*Attorney, Agent, or Firm*—John W. Henderson, Jr.

[57] ABSTRACT

A high resolution line scanner for converting optical images into electrical signals by a means of photoconductor switches and strain induced resistor sensing. The line scanner includes (1) a plurality of parallel magnetoresistive stripes spaced apart on a low acoustic loss substrate, e.g., fused quartz, glass, etc., (2) a layer of photoconductive material having a time constant less than the time needed to read a line on a moving page covering one end of the magnetoresistive stripes and (3) a transparent electrode covering the photoconductor material and electrically connected to a power source. A scanning acoustic pulse is propagated in the substrate under the magnetoresistive stripes and induces an output by altering the resistivity of the magnetoresistive stripes when the photoconductive layer selectively connects the power source to the magnetoresistive stripes in accordance with an optical image impressed upon the layer.

6 Claims, 8 Drawing Figures

HIGH RESOLUTION LINE SCANNER

BACKGROUND OF THE INVENTION

1. Field of the Invention

This invention relates to apparatus for converting an optical pattern into a form useable by a machine and, more particularly, to apparatus for converting an optical pattern into electrical signals by a means of photoconductor switches and strain induced sensing.

2. Description of the Prior Art

Optical pattern sensing requires scanners or other devices to convert optical representations into electrical signals. The electrical signals may then be used to reproduce the optical pattern or analyzed in order to identify the pattern. Optical scanners have developed from the cathode ray tube "flying spot" scanner to solid state scanners which use the "optical-to-acoustic" converter to alter acoustic signals with optical patterns.

In scanners of the latter type, the pattern to be converted is impressed upon the optical-to-acoustic converter while trains of acoustic pulses are propagated within the converter by a first acoustic transducer. The amplitude of the acoustic pulses is modulated by the intensity of the light impressed upon the converter. A second acoustic transducer is provided which converts the modulated acoustic pulses into electrical signals whose amplitudes represent the configuration of the applied optical pattern. In order to convert an optical pattern into electrical signals using the foregoing scanner, the optical pattern must first be converted into acoustic signals and the acoustic signals then converted into electrical signals. The electrical signal is fed back to the input transducer and recirculated through the converter several times while impressing the same optical image upon the acoustic pulse. This configuration requires reapplying the same optical pattern to the converter several times in order to increase the resolution to an acceptable level. Reapplying the signal several times is time consuming, and reduces the efficiency at which the system can operate. Additionally, this configuration has the photoconductor layer in the acoustic path which attenuates the propagating acoustic signal.

OBJECTS OF THE INVENTION

It is an object of the present invention to provide a solid state line scanner which converts optical images directly into electrical signals.

It is another object of the present invention to provide a line scanner in which the resolution is independent of the scanning acoustic pulse.

It is a further object of the present invention to provide a line scanner in which the photoconducting layer is not within the acoustic path.

SUMMARY OF THE INVENTION

The line scanner, according to this invention, by which these objects can be accomplished utilizes the effects of photoconductor switches and strain induced resistor sensing and is characterized by a plurality of parallel magnetoresistive (MR) stripes having a uniform linewidth, spacing, and thickness which are deposited on a low acoustic loss substrate. Each MR stripe is connected at one end to a conducting pad of uniform dimensions and is connected at the opposite end to a common conducting bus.

When a line of optical image is incident on the photoconductor layer the resistance of the photoconductor is reduced in the light "spots" and the photoconductor selectively connects the MR stripes to a power source. An acoustic transducer mounted on the substrate proximate the MR stripes, propagates a scanning acoustic pulse through the substrate normal to the MR stripes. As the acoustic pulse interacts with each MR stripe, a transient resistance change is produced in the stripe resulting in a transient change in the current flowing through the stripe. A sensing detector, connected to the common conducting bus, senses the transient current change and produces an output signal accordingly.

At the dark regions of the scanner, the photoconductor resistance is so large that no current flows in the MR stripes thereunder and the change in resistance of these stripes produces no detectable change in the output.

By using the photoconductor as switches to each MR stripe, the scanning acoustic pulse causes the optical pattern in each line to be read serially. A photoconductor material is selected which has a time constant less than the time needed to read a line as the page moves, enabling this line scanner to read the whole page.

DESCRIPTION OF THE PREFERRED EMBODIMENT

Figure 1:
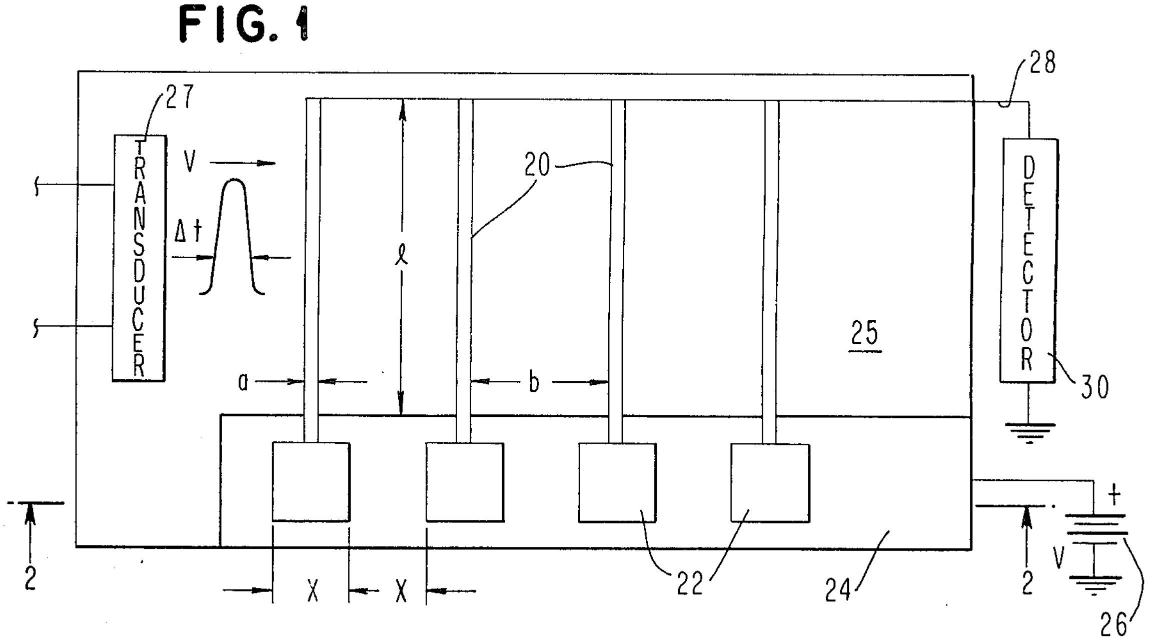
FIG. 1 is a plan view showing DC configuration of the high resolution line scanner of this invention.
Figure 2:
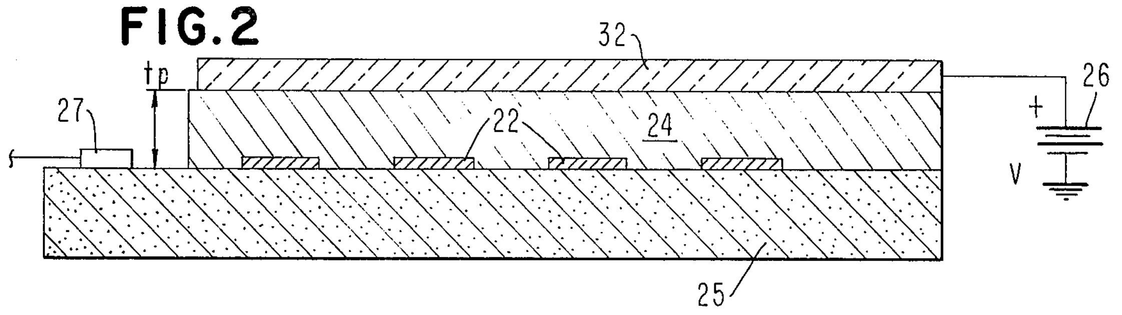
FIG. 2 is a sectional view taken across 2—2 in FIG. 1.

One device configuration for a high resolution line scanner is shown in FIG. 1 and FIG. 2. A plurality of MR stripes 20 with linewidth $a$, spacing $b$, and thickness $t$ is deposited on a fused quartz substrate 25. While fused quartz has been chosen for use in describing the preferred embodiment of this invention, other low acoustic loss materials well known in the art may be used, e.g. glass. One end of each MR stripe 20 is connected to a conducting pad 22 of width $x$. The conducting pads 22 are also separated by spacing $x$. The dimensions and spacing of conducting pads 22 determine the spot resolution of the output electrical signal. For example, in the preferred embodiment, an $x$ of 5 mils was found to produce satisfactory results for a page scanner. However, $x$ may be made smaller or larger depending on the typical size of the light and dark regions to be processed.

A layer of photoconductive material 24, of width determined by the width of a line of type on a printed page, is deposited on top of the conducting pads 22. Mounting the photoconducting material 24 on top of the conducting pads 22 rather than in the acoustic path offers the advantage of avoiding unnecessary acoustic attenuation which would be caused by the photoconductor if it were in the acoustic path. Additionally, as stated above, the resolution becomes independent of the acoustic pulse beam width and dependent only on the size of the conducting pads 22.

On top of the photoconductive layer 24 is deposited a layer of transparent electrode 32 which is connected to a constant voltage source 26. The photoconductive layer 24 operates as a plurality of switches that close to connect the electrode 32 to the conducting pads 22 in the light regions and which remain open in the dark regions of an optical image impressed upon the scanner. Any conventional technique may be used to impress the optical image upon the scanner including placing the paper directly on the scanner while focusing a light beam on the opposite side or using a combination of lenses with the light beam if magnification of the image is desired.

Still referring to FIGS. 1 and 2, it can be seen that the other end of the MR stripes 20 are connected to the conducting bus line 28 which leads to a load detector 30. The load detector 30 may be a resistor in combination with an operational amplifier or other sensing device which is known in the art. An acoustic transducer 27 connected to a suitable source of excitation e.g., a pulse generator is mounted on the substrate 25 adjacent to the MR stripes 20. While an acoustic surface wave transducer is used in the preferred embodiment, it is understood, by those of skill in the art, that a bulk acoustic transducer could also be used.

When excited, the acoustic transducer 27 propagates an acoustic pulse in the substrate 25 along the direction normal to the MR stripes 20 producing a transient resistance change in each stripe 20 during the time of interaction. As the acoustic pulse scans across the substrate 25, each MR stripe 20 undergoes a resistance change in turn and a corresponding current change is sensed at the output if the photoconductor switch is closed. This scanning acoustic pulse causes the output of each MR stripe 20 to be read serially by the output detector 30.

The output of the detector 30 is in a digital form which may be stored or used to reproduce the input optical pattern.

Figure 4:
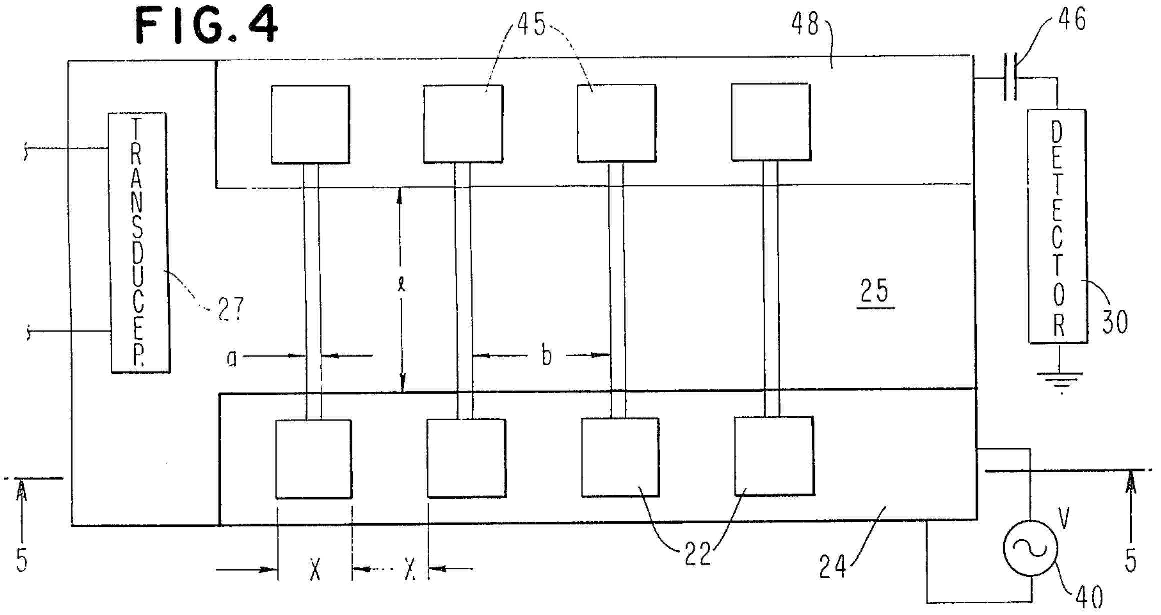
FIG. 4 is a plan view showing an AC configuration of the high resolution line scanner of this invention.
Figure 5:
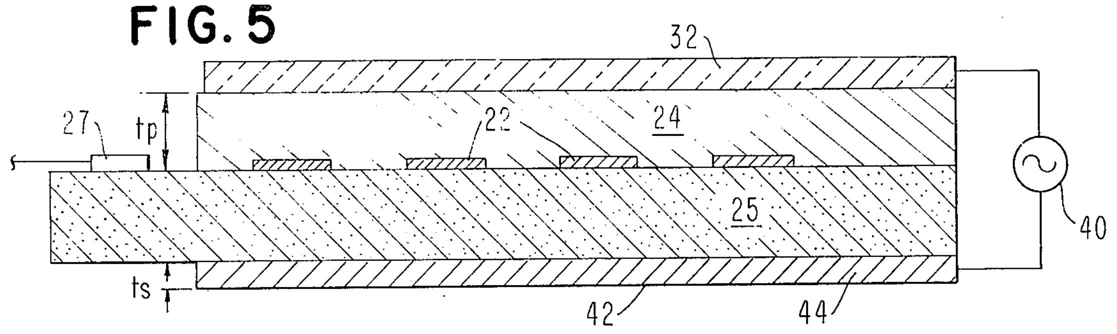
FIG. 5 is a sectional view taken across 5—5 in FIG. 4.

Referring now to FIGS. 4 and 5, an AC coupled configuration of the line scanning device is shown. The AC voltage 40 is applied to a ground plane 42 on top of which a layer of dielectric material 44 is deposited. The dielectric material 44 is sandwiched between the conducting pads 22 and the ground plane 42. The output ends of the MR stripes 20 are connected to conducting pads 45. A dielectric layer 48 is mounted on top of the conducting pads 45 and couples the output through capacitor 46 to the output detector 30. The remainder of the structure is the same as described for the DC configuration.

Figure 6:
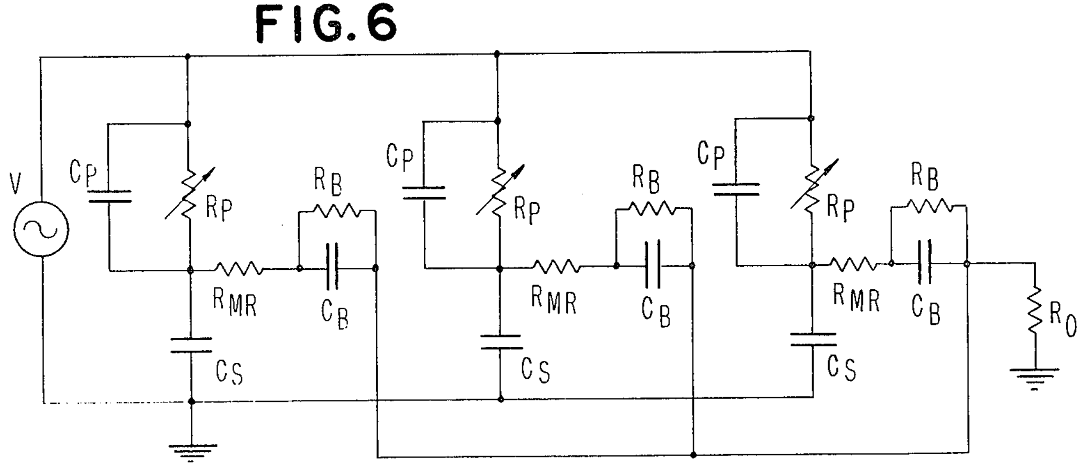
FIG. 6 is a circuit diagram of the equivalent circuit for the line scanner of FIG. 4.

FIG. 6 shows the equivalent circuit for the AC coupled line scanner. The junction capacitances are given as follows:

$$C_s = \epsilon_s\, x^2/t_s \text{ and } C_b = \epsilon_b\, x^2/t_b$$

$C_s$ is the capacitance produced by the sandwiched dielectric material 44 having a dielectric constant $\epsilon_s$ and thickness $t_s$, and $C_b$ is the capacitance of the output dielectric layer 48 having a dielectric constant $\epsilon_b$ and thickness $t_2$. $x^2$ is the area of the input conducting pads 22 and the output conducting pads 45. $R_b$ is the resistance associated with $C_b$.

When a spot on the line scanner is illuminated, the applied voltage has a charging path with a time constant $R_pC_s$ to the capacitor $C_s$. To prevent the possibility of charging the dark spot, the time constant $(R_p+2R_{MR})\, C_b/2$, for the bypass loop has to be much larger than $R_pC_s$. As the capacitance $C_s$ is charged up, the transient change $\Delta R_{MR}$ due to the interaction of the scanning acoustic pulse and the MR stripe produces a fast AC signal in the sensing loop which has a time constant $R_{MR}C_sC_b/(C_s+C_b)$. In order for the AC coupled configuration to operate, the time constant for each path must be designed properly by selecting dielectric material with a dielectric constant and thickness suitable to the timing requirements. Otherwise the operation of the AC configuration and the DC configuration are identical as will hereinafter be described.

OPERATION

Figure 3:
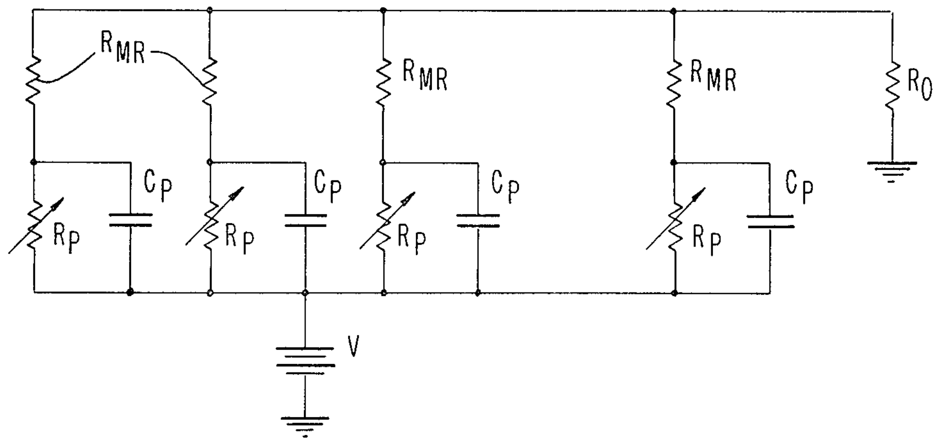
FIG. 3 is a circuit diagram of the equivalent circuit for the line scanner of FIG. 1.
Figure 7:
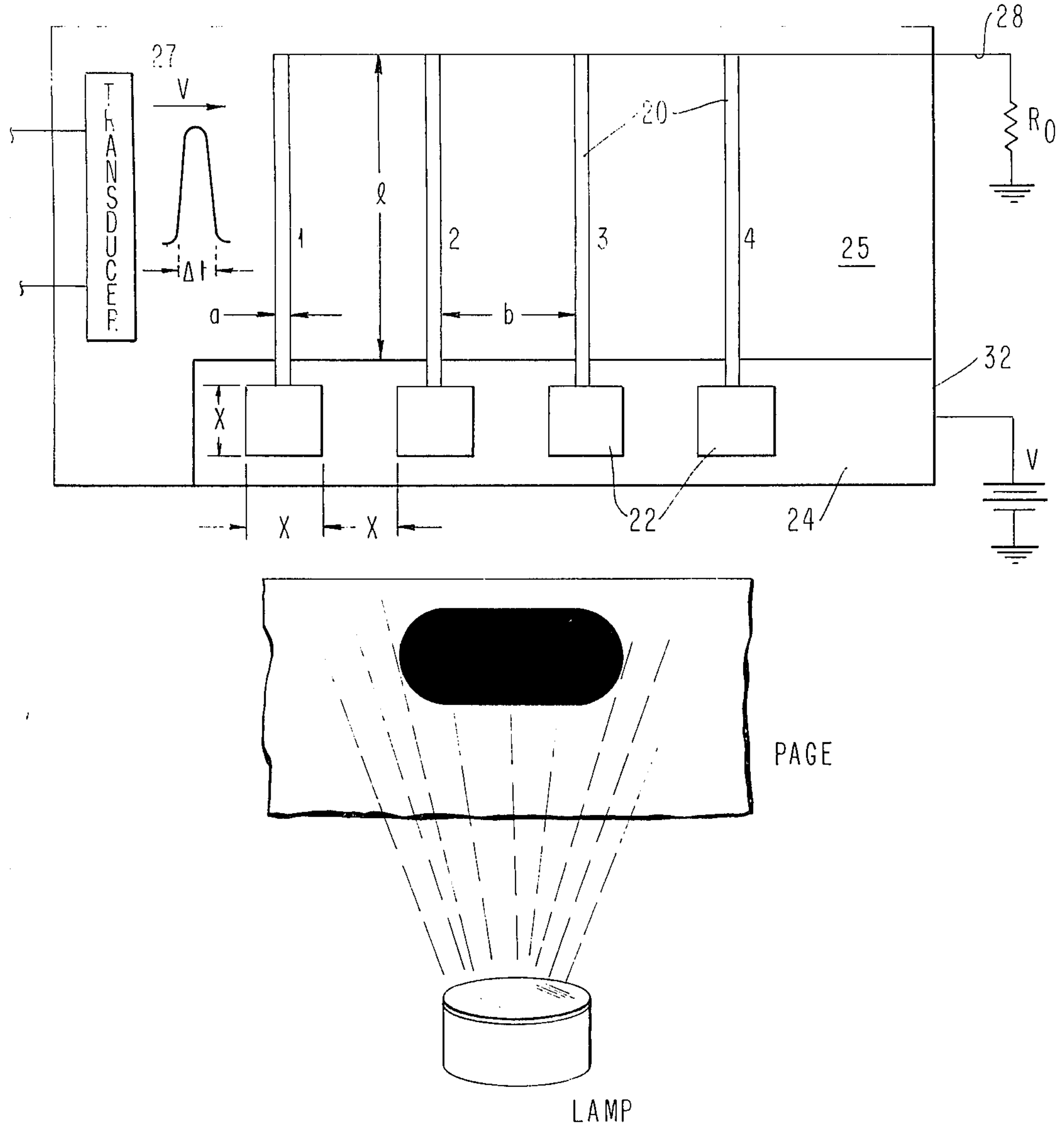
FIG. 7 is an example of an optical image incident up the line scanner of this invention.

Referring to FIGS. 3 and 7, when a line of optical image having spot resolution X is incident on the photoconductor layer 24, the resistance $R_p$ of the photoconductive layer 24 is reduced to a lower value in the illuminated spot and current flows from the electrode 32 through the photoconductor 24 to the conductor pad 22 underneath the spot. This current flows through the MR stripes 20 connected to the conducting pad 22, through the conducting bus line 28 and is sensed by output detector 30.

Transducer 27 produces an acoustic pulse in substrate 25 which propagates normal to stripes 20.

When the scanning acoustic pulse interacts with an illuminated MR stripe 20, it produces a transient resistance change ΔR during interaction time ΔT and induces a current change ΔI which can be detected by sensing the change in the voltage drop across output resistor $R_o$.

The component values for the equivalent circuit of FIG. 3 are determined as follows:

$$R_p = \frac{1}{\sigma}\;\frac{t_p}{x^2}$$

$$R_{MR} = \rho\;\frac{l}{a}$$

$$C_p = \frac{\epsilon_p x^2}{t_p}$$

where $R_p$ is the photoconductive resistance between the transparent electrode 32 and a conducting pad 22 having an area $x^2$. The magnitude of $R_p$ is determined by the conductivity δ of the photoconductor which is dependent on the light intensity at that spot and by the thickness $t_p$ of the photoconductor layer. $R_{MR}$ is the resistance of each MR stripe 20 and is determined by the sheet resistivity $\rho$, the length $l$ and the width $a$ of the stripe 20. $C_p$ is the capacitance of the photoconductor layer 24 between the electrode 32 and the conducting pad 22. $C_p$ depends on the dielectric constant $\epsilon$ , the thickness $t_p$ of the photoconductor layer 24 and the area $x^2$ of the conducting pad 22.

Figure 8:
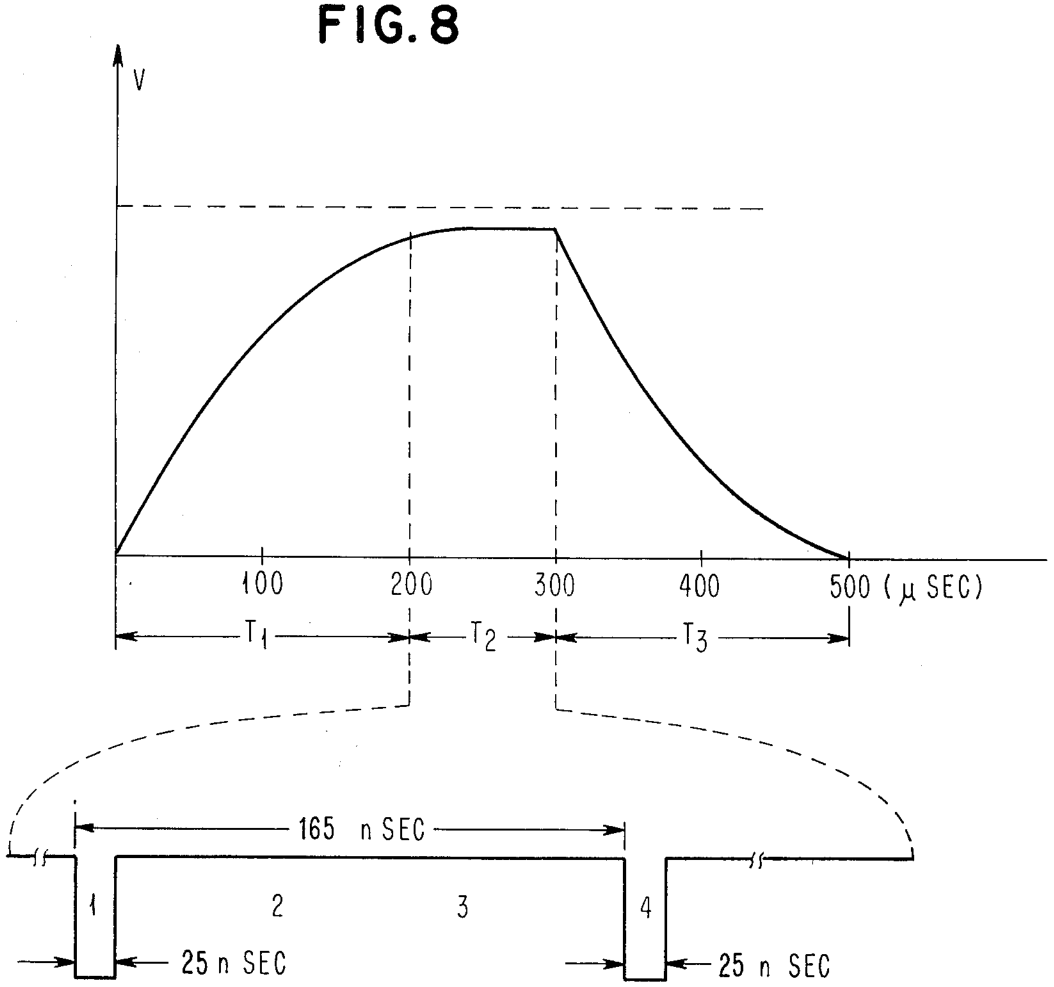
FIG. 8 shows the output voltage pattern for the incident optical image of FIG. 7.

FIG. 8 shows the voltage pattern across the output resistor $R_o$. During time $T_1$, the photoconductor 24 turns on in a spot of illumination and operates as a switch to connect the electrode 32 to the stripe 20 underneath the spot. A current $I_{MR}$ flows through the stripe 20 and output resistor $R_o$, and the voltage across $R_o$ rises toward the electrode voltage V. During time $T_2$, the scanning acoustic pulse, propagated from the acoustic transducer 27, interacts with MR stripe 20 causing an increase in the stripe resistance $\Delta R_{MR}$ and a corresponding decrease in current $\Delta I_{MR}$. The increase in stripe resistance $\Delta R_{MR}$ increases the voltage drop across the stripe 20 and causes a decrease in the voltage across resistor $R_o$. Assume $R_pC_p = 200$ μSec, $a = 1$ mil, $b = 10$ mils, and $\Delta t = 20$ nSec, where $R_pC_p$ is the turn on time $T_1$ of the photoconductor 24, $a$ is the width of MR stripes 20, $b$ is the distance between MR stripes 20 and $\Delta t$ is the width of the acoustic pulse propagated by transducer 27. If the velocity of the acoustic pulse is chosen as 200 mils/μSec, then the pulse will induce 25 nSec voltage pulses in the output resistor $R_o$ as it scans each stripe 20 in turn. In FIG. 7, stripes 1 and 4 are conducting since their pads are located in light "spots" of the document line while stripes 2 and 3 are nonconducting. The insert in FIG. 8 shows an expanded view of the scanning time $T_2$ of the acoustic pulse. It can be seen that voltage pulses of 25 nSec duration occur at 1 and 4 while no pulses occur at 2 and 3. These voltage pulses may be sensed by a suitable detector such as a operational amplifier to provide an output which may be used to reconstruct the input optical pattern. During the time $T_3$ the photoconductor switches off and is reset for the next line scan. Selection of a photoconductor which has a time constant less than the time needed to read a line as the paper moves, enables this line scanner to read the entire page.

While the invention has been particularly shown and described with reference to the preferred embodiments thereof, it would be understood by those of skill in the art that the foregoing and other changes in form and detail may be made therein without departing from the spirit and scope of the invention, e.g., the common output bus may be replaced by a detector on each stripe or a multiple of stripes to enable parallel scanning of the stripes instead of serial scanning.

What is claimed is:

1. A high resolution line scanner comprising:

a low acoustic loss substrate;

a plurality of parallel magnetoresistive stripes on said substrate for conducting electrical current therethrough;

a high conductivity transparent layer having a source of power electrically connected thereto;

a photoconductor layer of line width covering a first end of said magnetoresistive stripes and sandwiched between said stripes and said transparent layer for selectively electrically connecting said stripes to said transparent layer in accordance with the light and dark spots of an optical pattern incident thereon;

strain generating means connected to said substrate for propagating strain pulses normal to said magnetoresistive stripes, producing a transient change in the electrical current flowing through said magneto-resistive stripes;

detector means electrically connected to the second end of said magnetoresistive stripes for sensing the transient change in the current flowing therethrough and producing an output indicative of said change.

2. A high resolution line scanner comprising:

a low acoustic loss substrate;

a plurality of parallel current conducting magnetoresistive stripes of uniform width and spacing on said substrate;

a high conductivity transparent layer connected to a source of power;

a photoconductor layer of line width covering a first end of said magnetoresistive stripes and sandwiched between said stripes and said transparent layer for selectively electrically connecting said magnetoresistive stripes to said transparent layer in accordance with the light and dark spots of an optical pattern incident thereon;

conductor means commonly connected to the second end of said magnetoresistive stripes for receiving electrical signals therefrom;

strain generating means connected to said substrate and propagating strain pulses normal to the magnetoresistive stripes for producing a transient change in the electrical signal received by said conductor means;

detector means electrically connected to said conductor means for sensing the transient change in the electrical signal received by said conductor means and producing an output signal indicative of said change.

3. A high resolution line scanner for converting optical images into electrical signals comprising:

a low acoustic loss substrate;

a plurality of parallel magnetoresistive stripes on said substrate for conducting electrical current therethrough;

a plurality of conducting pads electrically connected to a first end of said magnetoresistive stripes;

a high conductivity transparent layer having a source of power electrically connected thereto;

a photoconductor layer of line width sandwiched between said conductivity pads and said transparent layer, said photoconductor layer functioning as a plurality of switches to selectively turn on said magnetoresistive stripes in accordance with the illuminated regions of an optical pattern impressed thereon;

conductor means commonly connected to the second end of said magnetoresistive stripes for recieving electrical signals from said stripes;

strain generating means mounted on said strain responsive substrate for propagating strain pulses in said substrate to said magnetoresistive stripes, said strain pulses producing transient resistance changes in said magnetoresistive stripes resulting in a corresponding transient change in the signals received by said conductor means; and sensing means electrically connected to said conductor means for sensing the transient changes in the signals in said conductor means for producing an output signal.

4. The high resolution line scanner of claim 3 wherein said conducting means includes conducting pads deposited on the second end of each of said magnetoresistive stripes, and a dielectric layer deposited on said conducting pads electrically connecting said pads together.

5. The high resolution line scanner of claim 1 wherein said strain generating means is an acoustic transducer.

6. The high resolution line scanner of claim 1 wherein the space between the conducting pads and the width of the pads is uniform.

* * * * *